(12) United States Patent
Schmidt

(10) Patent No.: US 10,391,981 B2
(45) Date of Patent: Aug. 27, 2019

(54) WASHING APPARATUS FOR A SENSOR ENCLOSURE

(71) Applicant: FORD GLOBAL TECHNOLOGIES, LLC, Dearborn, MI (US)

(72) Inventor: David J. Schmidt, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 15/381,655

(22) Filed: Dec. 16, 2016

(65) Prior Publication Data
US 2018/0170319 A1    Jun. 21, 2018

(51) Int. Cl.
| | |
|---|---|
| *B60S 1/02* | (2006.01) |
| *B60S 1/08* | (2006.01) |
| *B60S 1/56* | (2006.01) |
| *B60S 1/26* | (2006.01) |
| *B60S 1/48* | (2006.01) |
| *G02B 27/00* | (2006.01) |
| *G01S 17/93* | (2006.01) |
| *G01S 7/481* | (2006.01) |

(52) U.S. Cl.
CPC .............. *B60S 1/566* (2013.01); *B60S 1/0803* (2013.01); *B60S 1/0818* (2013.01); *B60S 1/26* (2013.01); *B60S 1/485* (2013.01); *G01S 7/4813* (2013.01); *G01S 17/936* (2013.01); *G02B 27/0006* (2013.01)

(58) Field of Classification Search
CPC ...... B60S 1/08; B60S 1/02; B60S 1/04; B60S 1/485; B60S 1/586
See application file for complete search history.

(56) References Cited

U.S. PATENT DOCUMENTS

| | | | | |
|---|---|---|---|---|
| 2,877,485 | A | * | 3/1959 | Oishei .................... B60S 1/482 15/250.02 |
| 3,452,932 | A | * | 7/1969 | Davies .................... B60S 1/546 15/250.01 |
| 3,583,021 | A | * | 6/1971 | Druseikis .............. B60S 1/0402 15/250.13 |
| 3,659,307 | A | | 5/1972 | Vitou et al. |
| 3,693,209 | A | * | 9/1972 | Winkelmann ........ B60S 1/3409 15/250.21 |
| 5,208,938 | A | | 5/1993 | Webb |
| 5,390,391 | A | * | 2/1995 | Zimmer ................ B60S 1/3409 15/250.202 |

(Continued)

FOREIGN PATENT DOCUMENTS

| | | |
|---|---|---|
| DE | 102013006686 A1 | 10/2014 |
| JP | 2005291808 A | 10/2005 |

OTHER PUBLICATIONS

English Machine Translation of JP2005291808A.
(Continued)

*Primary Examiner* — Michael D Jennings
(74) *Attorney, Agent, or Firm* — Jason Rogers; Vichit Chea; King & Schickli, PLLC

(57) ABSTRACT

A washing apparatus is provided for a sensor enclosure. That washing apparatus includes a wiper assembly and a control module. The control module is configured to displace a wiper blade of the wiper assembly between a stowed position free of the sensor enclosure and a deployed position engaging the sensor enclosure.

9 Claims, 9 Drawing Sheets

(56) References Cited

U.S. PATENT DOCUMENTS

| | | | | |
|---|---|---|---|---|
| 5,442,834 | A * | 8/1995 | Perry | B60S 1/38 |
| | | | | 15/250.04 |
| 6,453,504 | B1 * | 9/2002 | Burkard | B60R 1/0602 |
| | | | | 15/250.003 |
| 8,692,980 | B2 | 4/2014 | Gilliland et al. | |
| 2008/0072393 | A1 * | 3/2008 | Tanaka | A47L 1/02 |
| | | | | 15/250.03 |
| 2013/0175962 | A1 * | 7/2013 | Sabi | B60S 1/08 |
| | | | | 318/468 |
| 2013/0193129 | A1 * | 8/2013 | Jones | B60S 1/3881 |
| | | | | 219/202 |
| 2015/0246660 | A1 * | 9/2015 | Seedall | B60S 1/26 |
| | | | | 359/507 |
| 2016/0068138 | A1 * | 3/2016 | Shami | B60S 1/026 |
| | | | | 134/6 |
| 2016/0121855 | A1 | 5/2016 | Doorley et al. | |
| 2016/0244028 | A1 * | 8/2016 | Wakatsuki | B60S 1/566 |

OTHER PUBLICATIONS

English Machine Translation of DE102013006686A1.
Cadie Thompson, Google wants all its self-driving cars to clean themselves—here's why, http://www.techinsider.io/google-patents-wiper-system-for sensors-2016-5, Sep. 21, 2016, pp. 4 of 4.

\* cited by examiner

WASHING APPARATUS FOR A SENSOR ENCLOSURE

TECHNICAL FIELD

This document relates generally to the motor vehicle equipment field and, more particularly, to a washing apparatus for a sensor enclosure.

BACKGROUND

Current and future motor vehicles are equipped with various sensors to allow for more efficient and safer operation. Semi-autonomous and fully autonomous vehicles will incorporate even more sensor systems for their efficient, effective and safe operation. For example, some autonomous vehicles may be equipped with light detection and ranging systems or Lidar. Lidar systems typically contain transparent surfaces or optical windows to allow the passage of laser light from laser light emitters located inside the Lidar housing.

As a consequence, externally mounted Lidar sensor systems may experience reduced overall performance due to obstruction of their laser light beams by accumulated dirt and debris on the optical windows. This can result over time due to such ambient conditions as rain, ice, snow, road dirt, dust, bug strikes and the like. Reduced Lidar performance may result in reduced optic detection and avoidance as well as other hazards related to vehicle localization positioning error and place recognition. Consequently, it is necessary to maintain clear optical windows for various sensors to ensure robust operation and performance of autonomous vehicles.

This document relates to a new and improved washing apparatus for a sensor enclosure. In accordance with this document the terminology "sensor enclosure" includes a dome, housing, optical window or other sensor structure which needs to be maintained clear of dirt, dust, debris or other obstruction that may be washed therefrom in order to maintain optimum sensor performance.

SUMMARY

In accordance with the purposes and benefits described herein, a washing apparatus is provided for a sensor enclosure. That washing apparatus comprises a wiper assembly and a control module. The wiper assembly includes a wiper blade. Further, the control module is configured to displace the wiper blade between a stowed position free of the sensor enclosure and a deployed position engaging the sensor enclosure.

The control module may include a controller and an actuator controlled by the controller. That actuator may be connected to the wiper assembly.

The washing apparatus may further include a cleaning fluid spray nozzle. In addition, the washing apparatus may further include a cleaning fluid reservoir and a cleaning fluid pump. That cleaning fluid pump may be controlled by the controller and configured to pump cleaning fluid from the cleaning fluid reservoir to the cleaning fluid spray nozzle.

The washing apparatus may further include a guideway. That guideway may include a first track below the sensor enclosure and a second track above the sensor enclosure. Further, the wiper assembly may include a wiper pivot, a first cam follower engaging the first track, a second cam follower engaging the second track and a wiper arm. The wiper arm has a first end that pivots about the wiper pivot and a second end that supports the first cam follower, the second cam follower and the wiper blade.

The first track and the second track may both be continuous. The first track and the second track may both also include a wiper park position.

In addition, the actuator of the control module may further include (a) a first wiper gear and a second wiper gear supporting the wiper pivot and (b) a drive motor configured to drive the wiper assembly around the guideway. That drive motor may be controlled by the controller.

In accordance with an additional aspect, a washing apparatus is provided for a sensor enclosure wherein the washing apparatus includes a guideway having a first track and a second track. The washing apparatus also includes a wiper assembly having a wiper blade. The wiper assembly also includes a first cam follower engaging the first track and a second cam follower engaging a second track. Further, the washing apparatus includes a control module. That control module is configured to displace the wiper assembly along the guideway.

The first track and the second track of the washing apparatus may be continuous. In addition the control module may include a controller and an actuator controlled by the controller. That actuator may include a first wiper gear, a second wiper gear and a drive motor engaging and driving the first wiper gear and the second wiper gear.

The wiper assembly may be carried on the first wiper gear and the second wiper gear. In addition, the first wiper gear and the second wiper gear may both be continuous. Further, the first wiper gear may be adjacent to and concentrically received within the first track while the second drive gear may be adjacent to and concentrically received within the second track.

The drive motor may be configured to drive the wiper assembly around the first track and the second track. Further, the first track and the second track may both include a park position for holding the wiper assembly when stowed between uses.

In the following description, there are shown and described several preferred embodiments of the washing apparatus. As it should be realized, the washing apparatus is capable of other, different embodiments and its several details are capable of modification in various, obvious aspects all without departing from the washing apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the washing apparatus and together with the description serve to explain certain principles thereof. In the drawing figures.

Reference will now be made in detail to the present preferred embodiments of the washing apparatus, examples of which are illustrated in the accompanying drawing figures.

DETAILED DESCRIPTION

Figure 1:
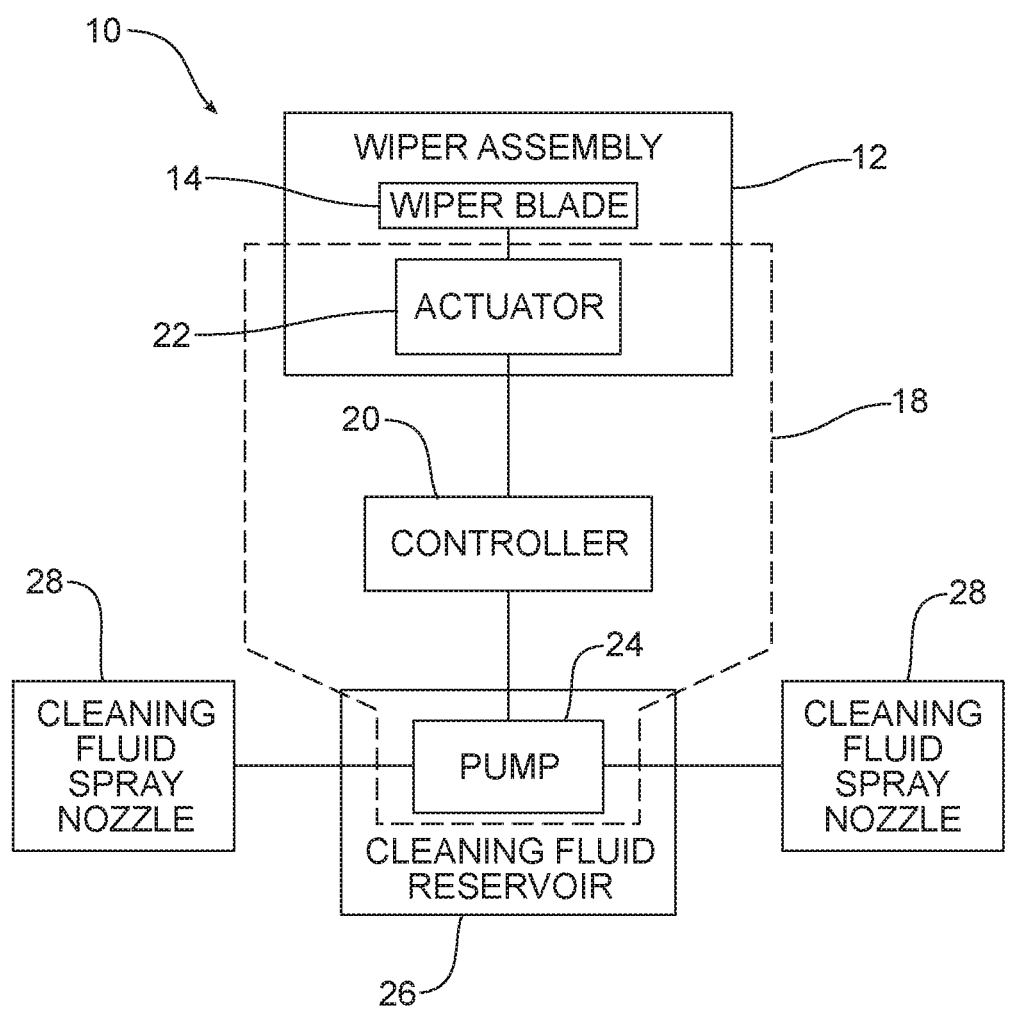
FIG. 1 is a schematic block diagram of the washing apparatus.

Reference is now made to FIG. 1 which is a schematic illustration of the washing apparatus 10. As illustrated, the washing apparatus 10 includes a wiper assembly 12 which includes a wiper blade 14 carried on a wiper arm 16 (shown in FIGS. 2a-2c). The washing apparatus 10 also includes a control module 18 that is configured to displace the wiper blade 14 between a stowed position free of a sensor enclosure (not illustrated in FIG. 1) and a deployed position engaging the sensor enclosure.

As illustrated in FIG. 1, the control module includes a controller 20. The controller 20 is a computing device such as a dedicated microprocessor or electronic control unit (ECU) operating in accordance with instructions received from appropriate control software. Thus, the controller 20 may comprise one or more processors, one or more memories and one or more network interfaces all communicating with each other over a communication bus.

The control module 18 also includes an actuator 22 that is connected to the wiper assembly 12 and adapted to displace the wiper arm 16 and the wiper blade 14 carried on that wiper arm between the stowed position and the deployed position in response to the controller 20. In some embodiments, the actuator 22 is also adapted to drive the wiper assembly 12 along a guideway (not shown in FIG. 1) around the sensor enclosure to be cleaned.

As further illustrated in FIG. 1, the control module 18 may also include a pump 24. Pump 24 may be controlled by the controller 20 and is adapted to pump cleaning fluid from a cleaning fluid reservoir 26 to one or more cleaning fluid spray nozzles 28 that direct that cleaning fluid onto the sensor enclosure being wiped clear by the wiper blade 14.

Figure 2A:
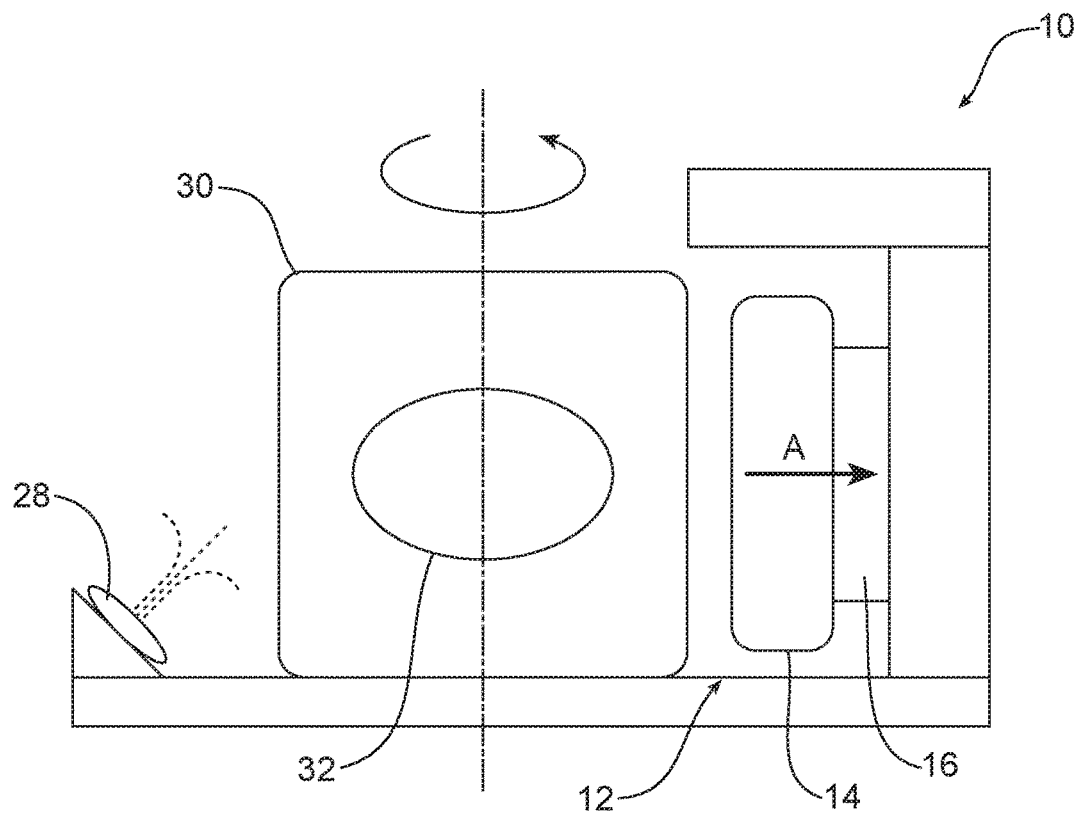
FIG. 2a is a schematic illustration of a first embodiment of the washing apparatus illustrating the wiper blade in a stowed position free of the sensor enclosure.
Figure 2B:
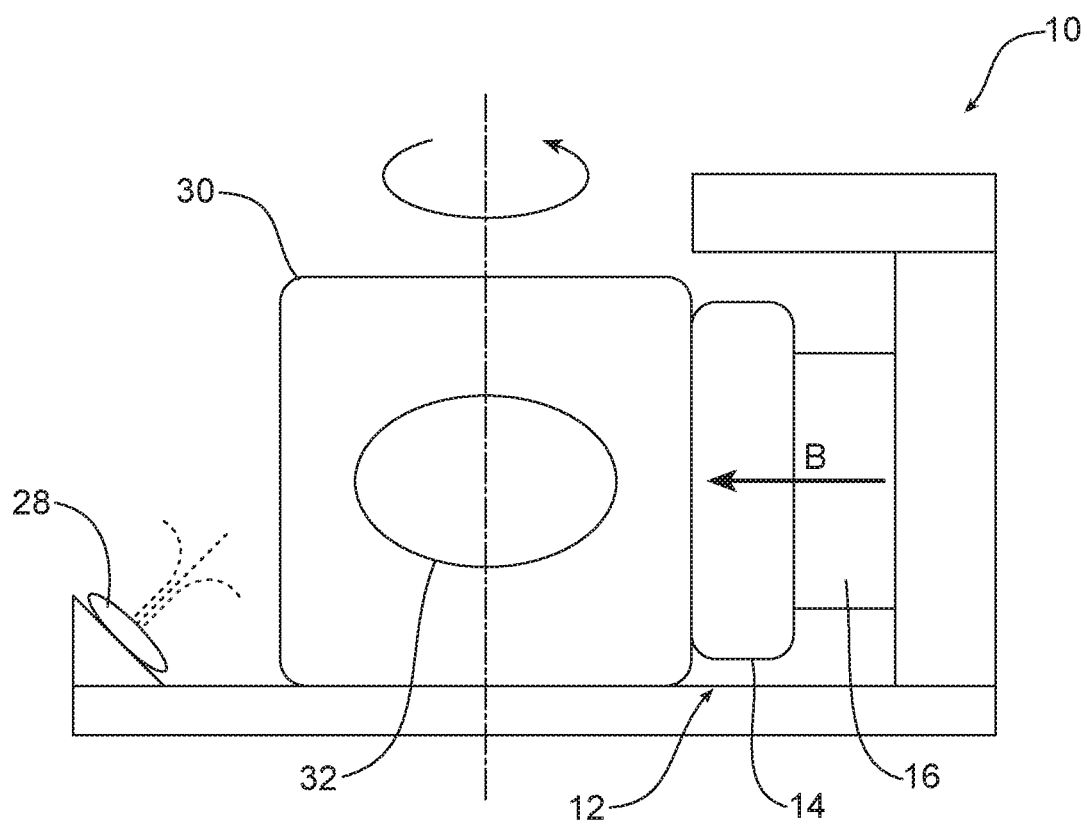
FIG. 2b is a schematic illustration of the first embodiment similar to FIG. 2a but illustrating the wiper blade in a deployed position engaging the sensor enclosure.
Figure 2C:
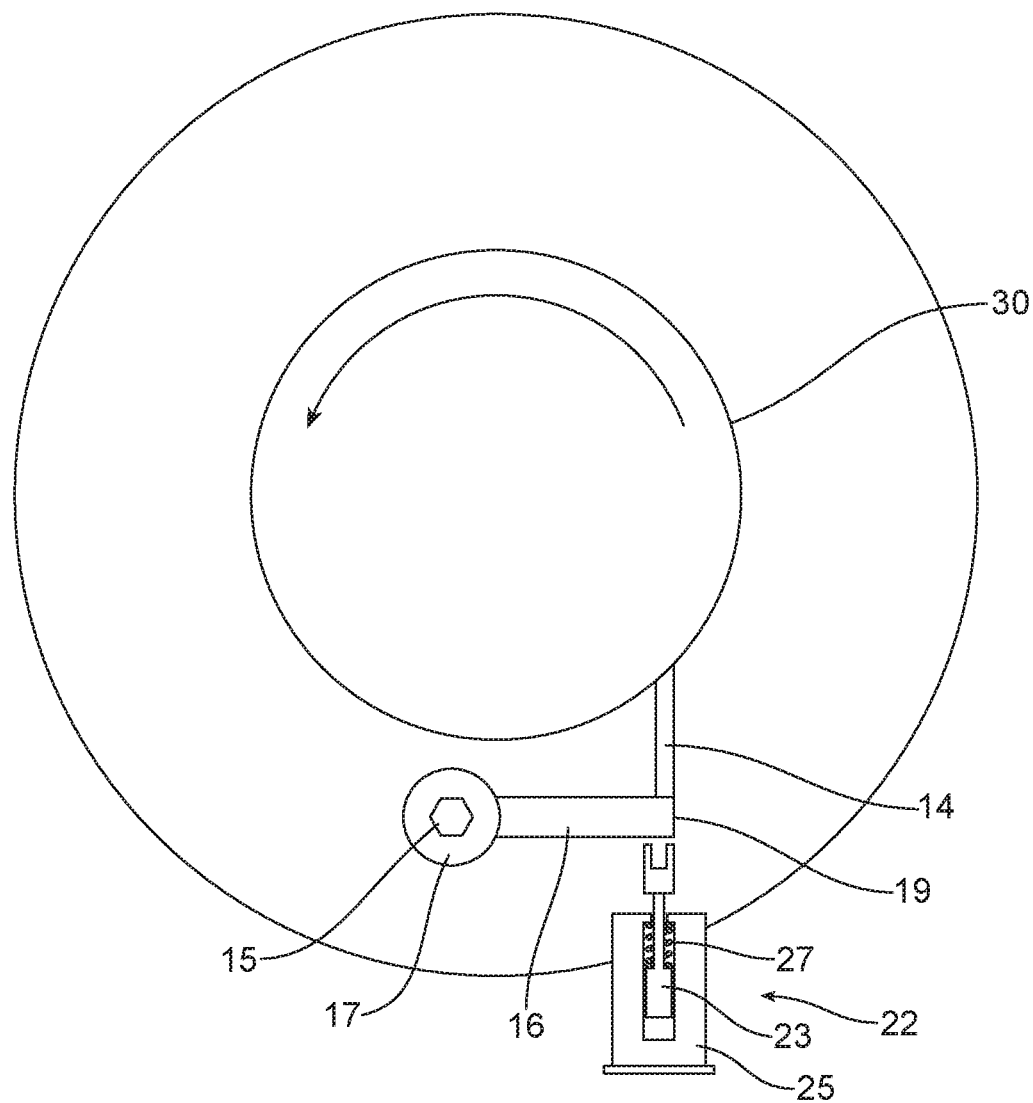
FIG. 2c is a schematic top plan view illustrating the first embodiment of the washing apparatus illustrated in FIGS. 2a and 2b.

Reference is now made to FIGS. 2a-2c illustrating a first possible embodiment of the washing apparatus 10 for use with a Lidar system with a rotating sensor enclosure 30. In FIG. 2a, the washing apparatus 10 is illustrated with the wiper blade 14 in the stowed position free and clear of the sensor enclosure 30. In contrast, FIGS. 2b and 2c illustrate the first embodiment of the washing apparatus 10 with the wiper blade 14 in the deployed position in engagement with the sensor enclosure 30. As illustrated in FIGS. 2a and 2b, the sensor enclosure 30 includes an optical window 32 and the sensor enclosure 30 rotates relative to the wiper assembly 12 of the washing apparatus 10.

In the embodiment illustrated in FIGS. 2a-2c, the wiper assembly 2 includes a wiper pivot 15. The first end 17 of the wiper arm 16 pivots about the wiper pivot 15 and the second end 19 of the wiper arm supports the wiper blade 14.

When the wiper blade 14 is in the stowed position, the sensor enclosure 30 is free of contact with the wiper blade as the Lidar or other sensor system within the sensor enclosure 30 operates gathering data for operation of the autonomous vehicle.

After operating for a predetermined period of time or in response to sensor data indicating the accumulation of dirt and debris on the sensor enclosure 30 or the optical window 32 of the sensor enclosure 30, the washing apparatus 10 may be activated. Upon activation, the controller 20 directs the pump 24 to pump cleaning fluid from the reservoir 26 through the one or more spray nozzles 28 which functions to direct that cleaning fluid onto the sensor enclosure 30 and the optical window 32.

In addition, as illustrated in FIG. 2b, the controller 20 directs the actuator 22 to displace the wiper arm 16 and the wiper blade 14 in the direction of action arrow A from the stowed position illustrated in FIG. 2a to the deployed position illustrated in FIGS. 2b and 2c. In the deployed position, the wiper blade 14 engages the sensor enclosure 30. As the sensor enclosure 30 and the optical window 32 are rotated, the wiper blade 14 sweeps dirt and debris, now entrained in the cleaning fluid, from the sensor enclosure 30 and the optical window 32 thereby cleaning the sensor enclosure 30 and optical window 32 to maximize the performance of the sensor system enclosed within the enclosure.

After the cleaning operation is completed as identified by time-out function or other appropriate sensors, the washing apparatus 10 is deactivated and the controller 20 sends a signal to the actuator 22 to displace the wiper blade 14 in the direction of action arrow B from the deployed position illustrated in FIGS. 2h and 2c to the stowed position illustrated in FIG. 2a wherein the wiper blade is free and clear of the sensor enclosure 30.

In the illustrated embodiment of FIGS. 2a-2c, the actuator 22 comprises a solenoid actuator having a plunger 23 connected to the wiper arm 16, an actuator coil 25 and a return spring 27. When the actuator coil 25 is energized, the plunger 23 is extended and the wiper arm 16 is pivoted about the wiper pivot 15 displacing the wiper blade 14 into the deployed position in cleaning engagement with the sensor enclosure 30 (see FIGS. 2b and 2c). When the actuator coil 25 is dc-energized, the return spring 27 biases the plunger 23 to the home position pivoting the wiper arm 16 about the wiper pivot 15 so as to displace the wiper blade 14 away from and free of the sensor enclosure 30 (see FIG. 2a).

Reference is now made to FIGS. 3a-3e illustrating an alternative embodiment of the washing apparatus 10. While the first embodiment of the washing apparatus 10 illustrated in FIGS. 2a-2c is particularly adapted for use with a sensor system incorporating a rotating sensor enclosure 30, such as the one illustrated having the optical window 32, the second embodiment illustrated in FIGS. 3a-3e is particularly adapted for use with a sensor system incorporating a stationary sensor enclosure 36 having an optical window 38.

In this second embodiment of the washing apparatus 10 illustrated in FIGS. 3a-3e, the housing 34 includes a guideway 40 having a first track 42 and a second track 44. In the illustrated embodiment the first track 42 is provided below the sensor enclosure 36 while the second track 44 is provided above the sensor enclosure. Both the first track 42 and the second track 44 are continuous cams that extend completely around the sensor enclosure 36.

As further illustrated in FIGS. 3a-3e, the wiper assembly 12 includes a wiper blade 14 that is carried on a wiper arm 16. The first end 17 of the wiper arm 16 pivots about the wiper pivot 15 and the second end 19 of the wiper arm supports a first cam follower 46, a second cam follower 48 and the wiper blade 14.

The actuator 22 of the second embodiment illustrated in FIGS. 3a-3e includes a first wiper gear 50, a second wiper gear 52 and a drive motor 54 connected by a drive shaft 56 and two pinions 58, 60 to the respective first and second wiper gears. The first wiper gear 50 is continuous and is positioned adjacent to and concentrically within the first track 42. Similarly, the second wiper gear 52 is continuous and is positioned adjacent to and concentrically within the second track 44. The wiper assembly 12 extends between and is mounted to the first wiper gear 50 and the second wiper gear 52 by the wiper pivot 15.

The first track 42 and the second track 44 both include a park position P defined between two opposed ramps 62, 64. The park position P of each track are vertically aligned with one another. In operation, the first cam follower 46 engages, rolls along and follows the first track 42 and the second cam follower 48 engages, rolls along and follows the second track 44. The two tracks 42, 44 are stationary while the two wiper gears 50, 52 are rotated by the drive motor 54.

Figure 3A:
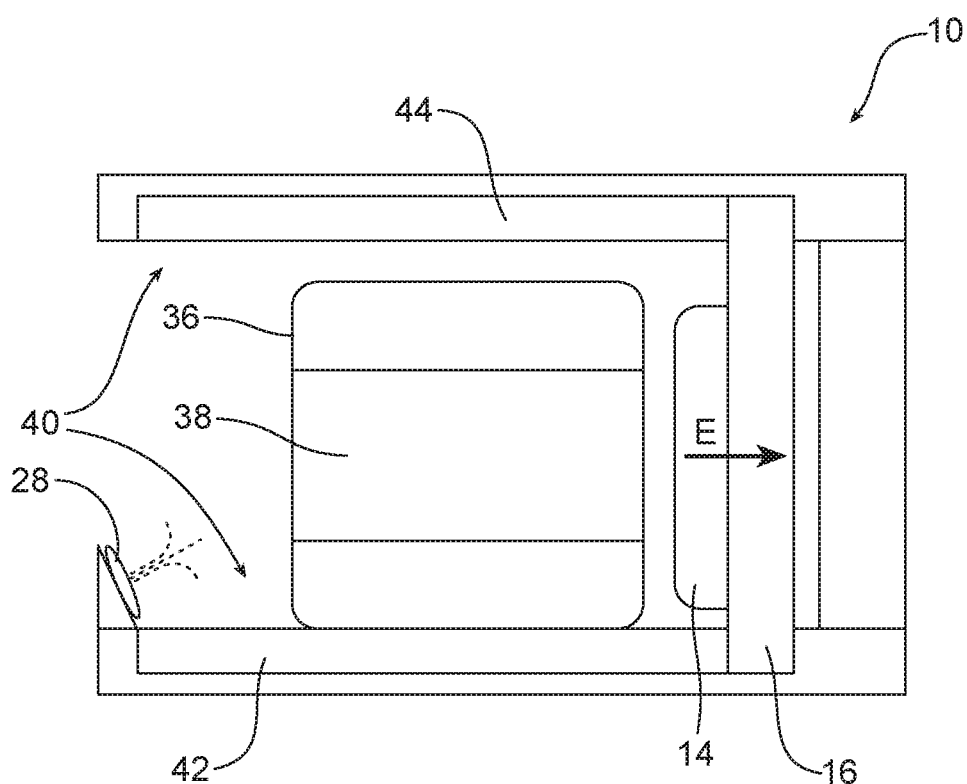
FIG. 3a is a schematic illustration of a second possible embodiment of the washing apparatus illustrating the wiper blade in a stowed position free of the sensor enclosure.
Figure 3B:
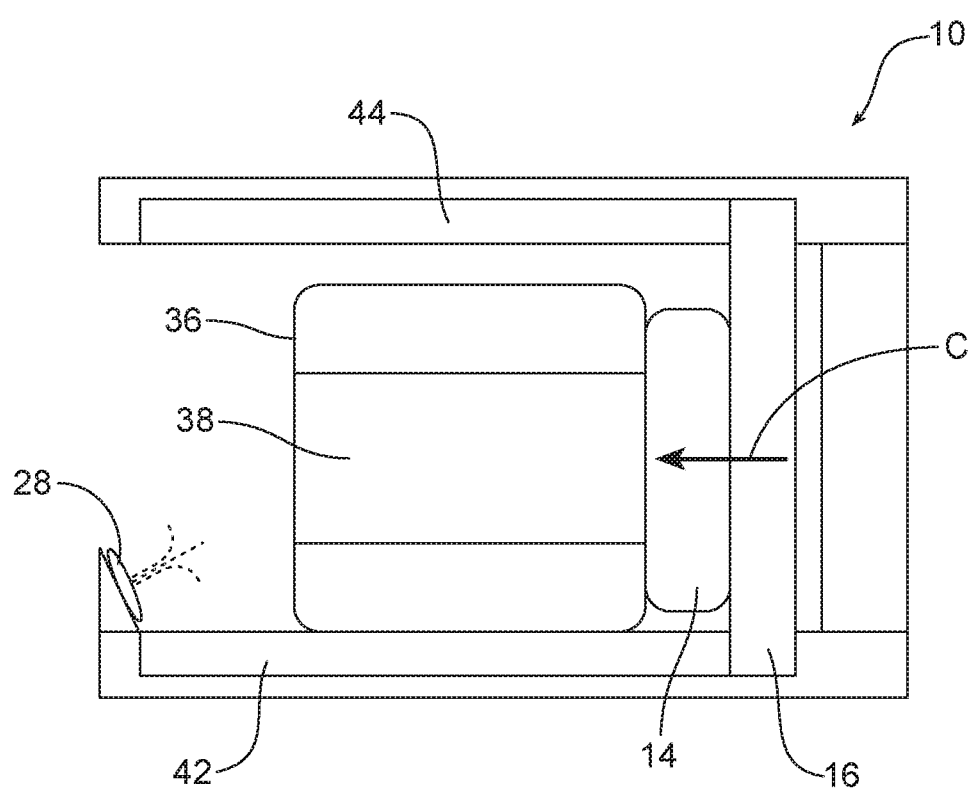
FIGS. 3b and 3c are schematic illustrations of the second embodiment similar to the FIG. 3a but showing the wiper blade in the deployed position engaging the sensor enclosure.
Figure 3C:
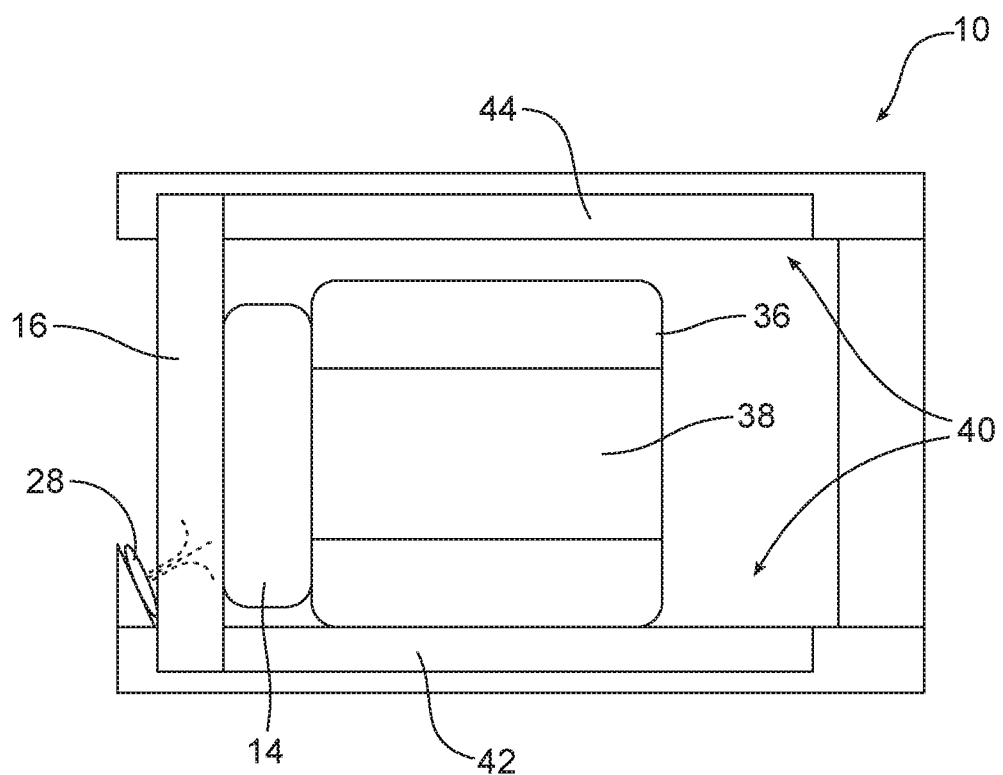
Figure 3D:
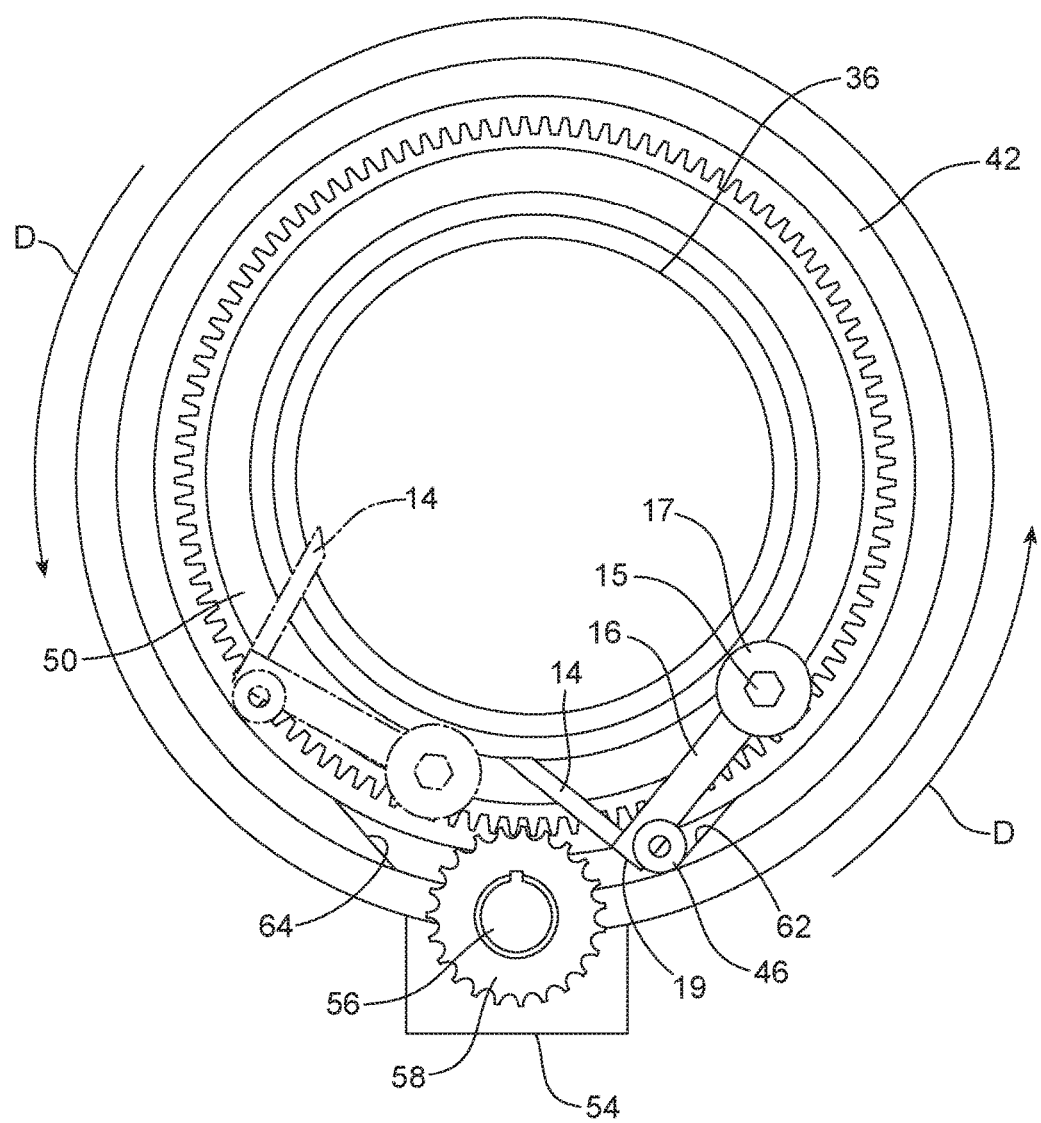
FIG. 3d is a detailed schematic plan view of the first wiper drive gear and first track of the second embodiment of the washing apparatus illustrated in FIGS. 3a-3c.
Figure 3E:
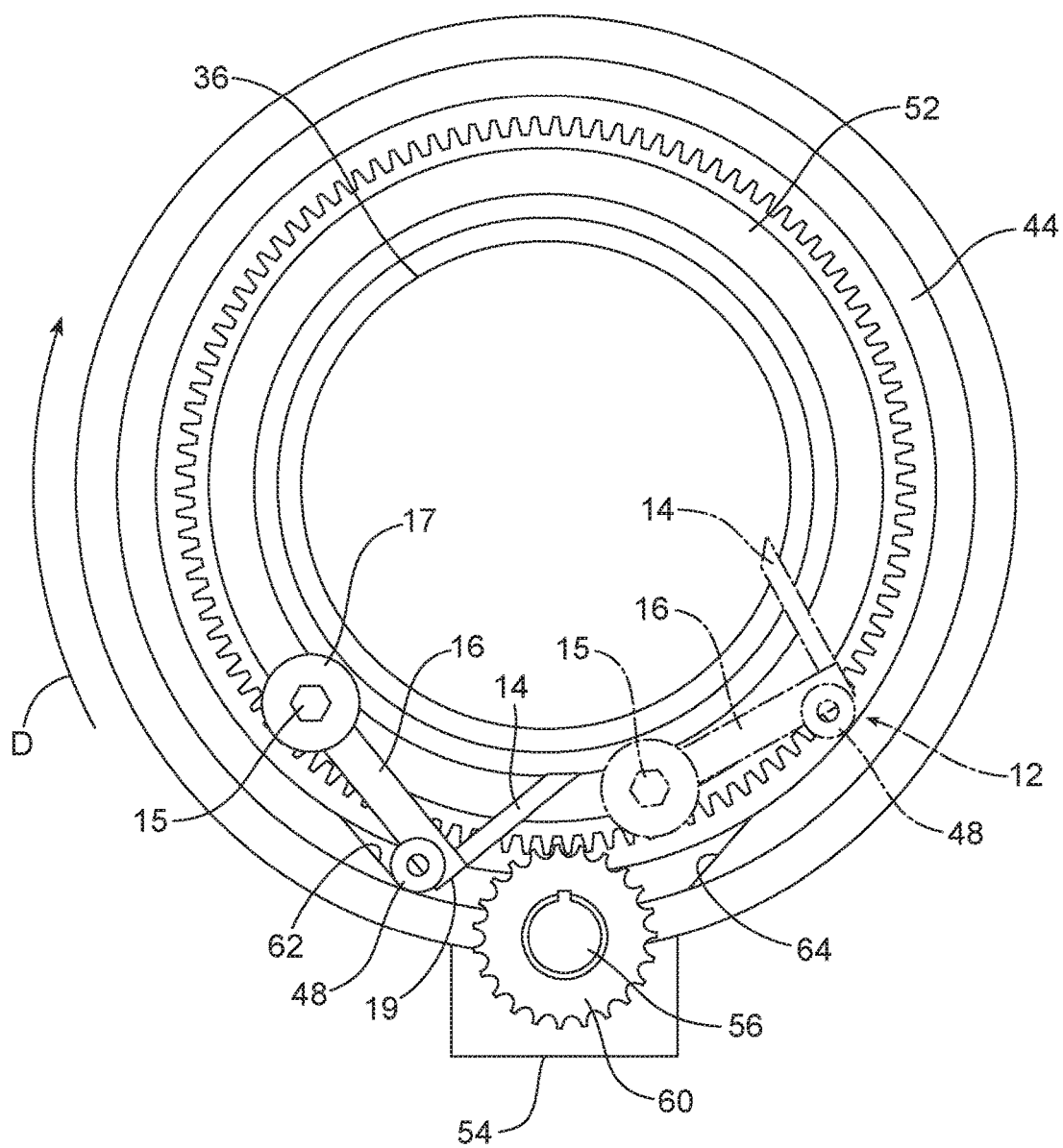
FIG. 3e is a detailed schematic plan view of the second wiper drive gear and second track of the second embodiment of the washing apparatus illustrated in FIGS. 3a-3d.

FIG. 3a and the full line depiction of the wiper assembly 12 in FIGS. 3d and 3e illustrate the second embodiment of the washing apparatus 10 in the deactivated position wherein the wiper blade 14 is in the stowed position free and clear of the sensor enclosure 36 and the optical window 38. In this position, the first cam follower 46 is in the park position P of the first track 42 and the second cant follower 48 is in the park position P of the second track 44.

After a predetermined period of time, or upon the detection of dirt and debris on the sensor enclosure 36 and optical window 38, the second embodiment of the washing apparatus 10 is activated. Upon activation, the controller 20 sends a signal to the actuator 22 which results in the actuator displacing the wiper blade 14 in the direction of action arrow C from the stowed position illustrated in FIG. 3a to the deployed position illustrated in FIG. 3b with the wiper blade engaging the sensor enclosure 36 and optical window 38. More specifically, the controller 20 activates the drive motor 54 which drives the two wiper gears 50, 52 in the direction of action arrow D. This causes the two cam followers 46, 48 to ride up the first of the opposed ramps 62 causing the wiper arm 16 to pivot about the wiper pivot 15 and thereby displace the wiper blade 14 into the deployed position in cleaning engagement with the sensor enclosure 36 and the optical window 38. The deployed position is illustrated in FIGS. 3b and 3c and illustrated in phantom line in FIGS. 3d and 3e.

In addition, the controller 20 sends an appropriate control signal to the pump 24 so the cleaning fluid is pumped by the pump from the cleaning fluid reservoir 26 through the one or more spray nozzles 28 which spray the cleaning fluid on the sensor enclosure 36 and optical window 38. The drive motor 54 drives the wiper assembly 12 continuously around the guideway 40 with the first and second followers 46, 48 of the wiper assembly riding or rolling along the respective first and second tracks 42, 44. FIGS. 3b and 3c illustrate how the wiper assembly 12 is driven around the guideway 40 and the continuous first and second tracks 42, 44 about the full 360° sidewall of the sensor enclosure 36 and optical window 38.

Upon returning to the park position P, the first cam follower 46 and the second cam follower 48 roll down the second of the ramps 64. This causes the wiper arm 16 to pivot about the wiper pivot 15 displacing the wiper blade 14 into the stowed position away from the sensor enclosure 36 and optical window 38 (see action arrow E).

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. An apparatus comprising:
   a sensor enclosure;
   a wiper assembly, including a wiper blade;
   a guideway wherein said guideway includes a first track below said sensor enclosure and a second track above said sensor enclosure; and
   a control module configured to displace said wiper blade between a stowed position free of said sensor enclosure and a deployed position engaging said sensor enclosure, said control module including a controller and an actuator controlled by said controller.

2. The washing apparatus of claim 1, wherein said wiper assembly includes a wiper pivot, a first cam follower, a second cam follower and a wiper arm having a first end that pivots about said wiper pivot and a second end that supports said first cam follower, said second cam follower and said wiper blade.

3. The washing apparatus of claim 2, wherein said first cam follower engages said first track and said second cam follower engages said second track.

4. The washing apparatus of claim 3, wherein said first track is continuous, said second track is continuous and said first track and said second track include a wiper park position.

5. The washing apparatus of claim 4, wherein said actuator includes a first wiper gear and a second wiper gear supporting said wiper pivot and a drive motor configured to engage said first wiper gear and said second wiper gear and drive said wiper assembly around said guideway wherein said drive motor is controlled by said controller.

6. A washing apparatus for a sensor enclosure, comprising:
   a guideway having a first continuous track and a second continuous track wherein said second track is opposed to said first track;
   a wiper assembly having a wiper blade, a first cam follower engaging said first track and a second cam follower engaging said second track; and
   a control module configured to displace said wiper assembly along said guideway, wherein said control module includes a controller and an actuator controlled by said controller and wherein said actuator includes a first wiper gear, a second wiper gear and a drive motor engaging and driving said first wiper gear and said second wiper gear.

7. The washing apparatus of claim 6, wherein said wiper assembly is carried on said first wiper gear and said second wiper gear.

8. The washing apparatus of claim 7, wherein said first wiper drive gear is continuous, said second wiper drive gear is continuous, said first wiper gear is adjacent to and concentrically received within said first track and said second gear is adjacent to and concentrically received within said second track.

9. The washing apparatus of claim 8 wherein said first track and said second track include a park position for said wiper assembly.

\* \* \* \* \*